United States Patent [19]

Watt

[11] 4,127,105

[45] Nov. 28, 1978

[54] ISOTHERMAL PROCESS SOLAR COLLECTOR PANEL

[76] Inventor: Richard E. Watt, 6384 Rockhurst Dr., San Diego, Calif. 92120

[21] Appl. No.: 821,655

[22] Filed: Aug. 4, 1977

[51] Int. Cl.² ............................................. F24J 3/02
[52] U.S. Cl. .................................... 126/271; 165/105
[58] Field of Search ......................... 126/271; 165/105

[56] References Cited

U.S. PATENT DOCUMENTS

| 3,779,310 | 12/1973 | Russell | 165/105 |
|---|---|---|---|
| 3,952,725 | 4/1976 | Edmondson | 126/271 |
| 4,011,856 | 3/1977 | Gallagher | 126/271 |
| 4,038,966 | 8/1977 | Harrison | 165/105 |
| 4,059,093 | 11/1977 | Knowles | 165/105 |
| 4,067,315 | 1/1978 | Fehiner et al. | 165/105 |

FOREIGN PATENT DOCUMENTS 2,307,232  11/1976  France ..................................... 126/271

Primary Examiner—Carroll B. Dority, Jr.
Attorney, Agent, or Firm—Brown & Martin

[57] ABSTRACT

An isothermal process solar collector panel is disclosed. The panel includes a collector plate for absorbing radiant heat; and a plurality of isothermal process heat pipes in an array over a surface of the collector plate. Each heat pipe is closed at both ends and contains thermodynamic working fluid for transferring heat energy from the collector plate to a second fluid flowing through a manifold pipe for conducting the heat energy from the collector panel. The manifold pipe is coupled to the heat pipes. One end of each heat pipe is coupled to the collector plate and has an evaporator section wherein heat energy is transferred from the collector plate to the thermodynamic working fluid; and the other end of each heat pipe is positioned within the manifold pipe and has a condenser section wherein heat energy is transferred from the thermodynamic working fluid to the second fluid flowing through the manifold pipe.

9 Claims, 4 Drawing Figures

ISOTHERMAL PROCESS SOLAR COLLECTOR PANEL

CROSS REFERENCE TO RELATED APPLICATION

This application is related to applicant's co-pending patent application entitled "Flat Plate Solar Collector Panel Having Extruded Thermal Conductors", Ser. No. 771,198, filed Feb. 23, 1977 and now U.S. Pat. No. 4,098,261.

BACKGROUND OF THE INVENTION

The present invention generally pertains to solar energy collection and is particularly directed toward improving solar collector panel design by increasing the thermal efficiency of the panel.

A typical solar collector panel includes a collector plate for absorbing radiant heat, and a plurality of pipes in an array fastened to the surface of the collector plate for transporting an operating fluid for conducting heat energy from the solar collector plate.

In the design of solar collector panels used for swimming pool heating, space heating, and other heating and cooling applications, it is desirable that optimum efficiency be attained so as to reduce the initial cost of installation by reducing the panel area required for a given installation. The thermal efficiency of a solar collector panel depends primarily upon its capacity for transferring heat absorbed by the collector plate into the fluid through direct heat conduction, and also through convection within the air voids between contacted surfaces of heat conducting elements.

Most solar collector panels presently being manufactured are not optimally efficient in conducting heat from the collection plate to the fluid. Typically the sheet stock for the collector plate is shaped to form semicircular channels into which the pipes are fitted. Because of the forming requirement, the sheet stock that is used is usually too thin to provide good lateral heat transfer from all parts of the collector plate to the pipes, thereby greatly reducing the operating efficiency. Also, machine forming of semicircular channels usually cannot be accomplished to the accuracy required for the close mating contact with the pipes required for efficient heat conduction.

The importance of achieving optimum thermal conductivity in a solar collector panel can be understood by examining the general equation for solar collector efficiency, which is:

$$\eta = F_R \left[ \overline{\alpha\tau} - U_L \frac{(T - Ta)}{q} \right]$$

Where:
$\eta$ = efficiency
$F_R$ = collector plate heat-removal efficiency factor
$\overline{\alpha\tau}$ = the averaged product of the collector plates' solar absorptance and the transmittance of the glazing cover
$U_L$ = collector overall heat-loss factor
Ti = inlet water temperature
$q$ = received solar radiation The three most important considerations in collector panel design involve the factors of $F_R$, $\overline{\alpha\tau}$ and $U_L$. The parameter $\overline{\alpha\tau}$ is affected by the choice of the glazing material and collector plate absorber surface. Insulation properties of the collector panel govern the $U_L$ factor.

The most neglected design factor in many of the current solar panels being marketed is that of $F_R$.

The collector plate heat-removal efficiency factor $F_R$, in effect, represents the thermal conductivity of the panels heat-generating apparatus. Efficient absorber surfaces, glazing materials and insulating materials are readily available and are employed in most collector designs. However, the heat-removal efficiency factor ($F_R$) is not as a rule given prime consideration. The object of this invention is to maximize collector thermal conductivity (the $F_R$ factor) and thereby increase thermal efficiency.

SUMMARY OF THE INVENTION

The present invention provides a more thermally efficient solar collector panel. The present invention is an isothermal process solar collector panel.

The panel includes a collector device for absorbing radiant heat; and a plurality of isothermal process heat pipes in an array over a surface of the collector device. In one preferred embodiment the collector device is a collector plate. In another preferred embodiment the outer surfaces of the heat pipes are adapted for absorbing radiant heat and thus serve as the collector device, and the collector plate is not necessarily included.

Each heat pipe is closed at both ends and contains a thermodynamic working fluid for transferring heat energy from the collector device to a second fluid flowing through a manifold pipe for conducting the heat energy from the collector panel.

The manifold pipe is coupled to the heat pipes. One end of each heat pipe has an evaporator section wherein heat energy is transferred from the collector device to the thermodynamic working fluid; and the other end of each heat pipe is positioned within the manifold pipe and has a condenser section wherein heat energy is transferred from the thermodynamic working fluid to the second fluid flowing through the manifold pipe.

The heat pipes conduct heat much more efficiently than the operating fluid pipes of prior art solar collector panels, and are not subject to being clogged by matter contained in the operating fluid. Heat pipes conduct heat at a very high rate, even higher than a solid metal conductor.

In the preferred embodiment wherein the collector device is a collector plate, the collector plate has a broad uniformly flat surface area over which the heat pipes are arrayed; and a plurality of thermal conductors are included for conducting heat energy from the collector plate to the heat pipes. Each of the thermal conductors has broad flat surfaces in contact with the flat surface of the collector plate on opposite sides of the heat pipe, and an inner surface in mating contact with most of the heat pipe; with the thickness of the thermal conductor increasing from the extreme ends of its broad flat surfaces toward its inner surface.

Because the heat pipes and thermal conductors are arrayed over a flat surface area of the collector plate and no channel forming is required, the plate may be thicker, thereby providing greater lateral heat transfer. A flat collector plate of uniform thickness is preferred because of the lower cost of manufacture, as contrasted with collector plates containing formed channels.

Preferably the thermal conductors are extrusions. An extrusion may readily provide the accuracy of fit to the heat pipe required for efficient thermal conduction.

The thermal conductors are shaped to provide a low thermal resistance path from the collector plate to the heat pipes. This low thermal resistance path is provided by the broad flat surfaces of the thermal conductors that are in contact with the flat surfaces of the collector plate, and by the increasing cross sectional area of the thermal conductors as the conduction path extends from the plate toward the heat pipe.

The thermal efficiency of this embodiment of the isothermal process solar collector panel of the present invention is further enhanced by the use of a thermal joint compound between the thermal conductors and the contacted surfaces of the heat pipes for filling voids between the thermal conductors and said contacted surfaces, and by a high temperature thermally conductive adhesive between the thermal conductors and the contacted surfaces of the collector plate for filling voids between the thermal conductor and said contacted surfaces. This adhesive also serves to adhere the thermal conductors to the collector plate.

DESCRIPTION OF THE PREFERRED EMBODIMENTS

Figure 1:
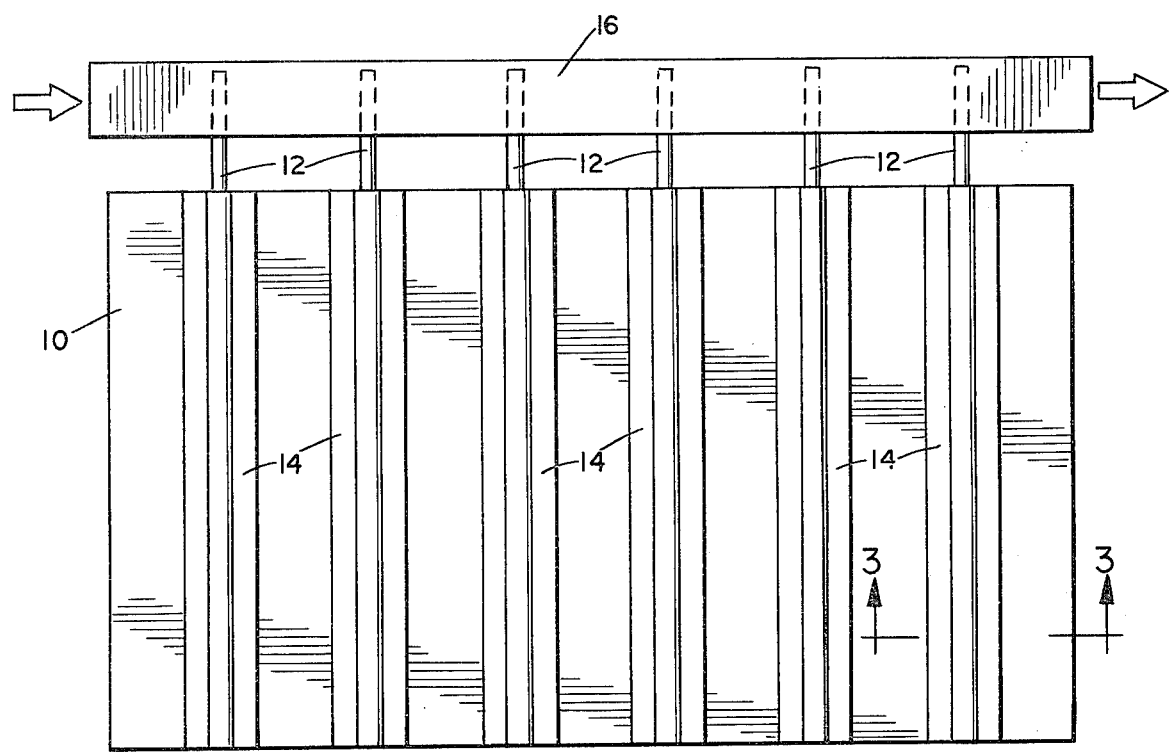
FIG. 1 is a plan view of one preferred embodiment of an isothermal process solar collector panel in accordance with the present invention.

Referring to FIG. 1, one preferred embodiment of a solar collector panel according to the present invention includes a flat collector plate 10 for absorbing radiant heat, a plurality of heat pipes 12, and a plurality of thermal conductors 14. The pipes 12 are connected to a manifold pipe 16.

Figure 2:
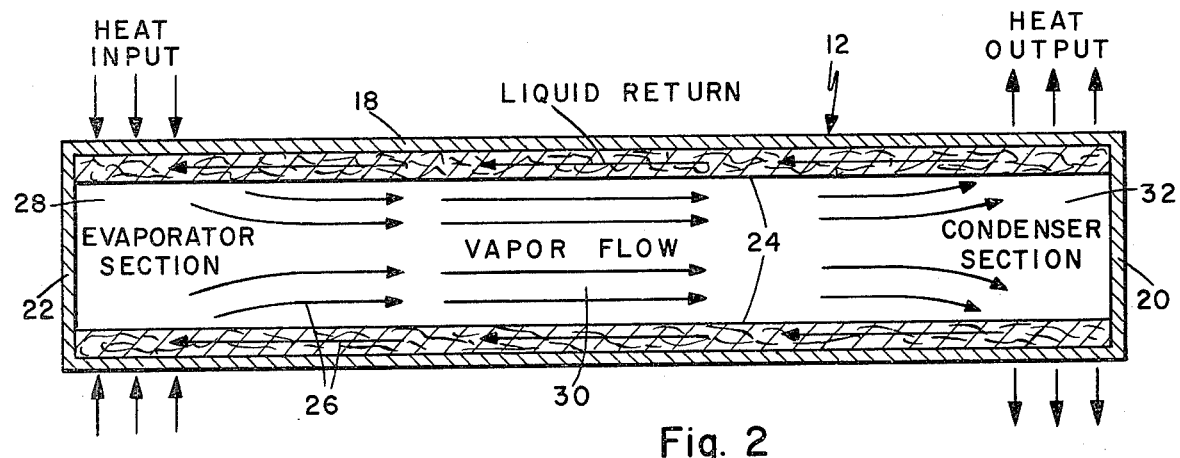
FIG. 2 is an enlarged cross sectional view taken lengthwise of a typical heat pipe included in the panel of FIG. 1.

Referring to FIG. 2, each heat pipe 12 consists of a tube 18 sealed on both ends 20, 22, an internal cylindrical capillary pumping structure, such as a wick, 24 and a thermodynamic working fluid 26 saturating the wick's pores. The transfer of heat energy occurs when the evaporator section 28 of the heat pipe 12 is heated to produce an evaporation of the working fluid 26, which vaporizes to fill the hollow interior 30 of the wick 24 and diffuses throughout the heat pipe 12. Condensation of the vapor is produced by cooling the condenser section 32 of the heat pipe 12, thereby reverting it to the liquid state. The liquid is then returned to the heat source (evaporator section) 28 by the capillary action of the wick 24. By this means, heat is continually transferred from one end 28 where heat is applied to the other end 32 where heat is extracted.

The rate of energy transfer in the heat pipe 12 depends mainly on the ability of the capillary wick 24 to return the working fluid 26 from the condenser section 32 to the evaporator section 28. Working fluids such as freon, organic fluids or even water can be used, providing that they have sufficient vapor pressure at the system operating temperature. In that the heat pipe 12 provides a sealed isothermal process with no moving parts, the heat pipe 12 provides a maintenance-free long life.

FIG. 1 shows a typical array of heat pipes 12 attached to a collector plate 10 for the purpose of transferring the heat energy absorbed from the sun into a cooling fluid (second fluid) carried by a manifold pipe 16. The condenser ends 20 of the heat pipes 12 are inserted into the interior of the manifold pipe 16, where they are in intimate contact with the cooling fluid, and thereby form a heat exchanger. The heat exchanger is thus a sealed unit with water or other cooling fluid passing only through the manifold pipe portion of the solar collector panel structure.

Figure 3:
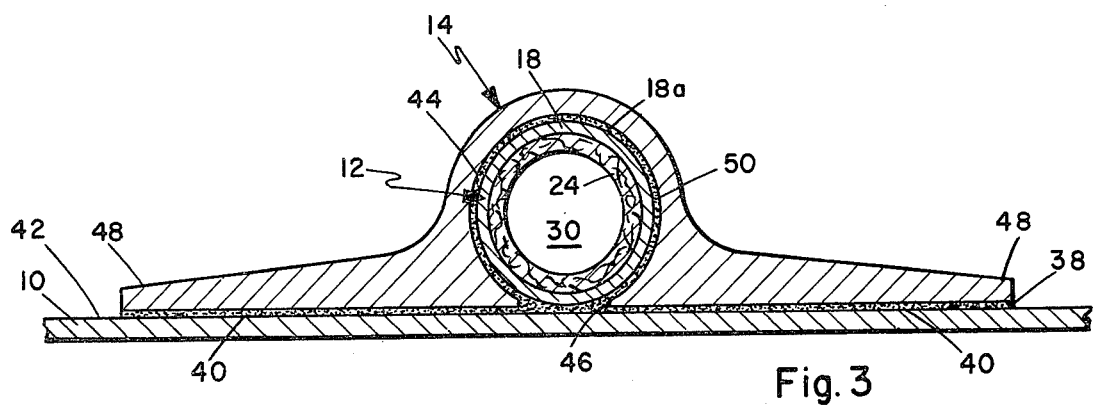
FIG. 3 is an enlarged sectional view taken on line 3—3 of FIG. 1.

The assembly of a thermal conductor 14 with a heat pipe 12 and flat collector plate 10 is shown in FIG. 3. To facilitate a permanent assembly, a high temperature thermally conductive adhesive 38 is used to join the thermal conductor 14 to the collector plate 10. This adhesive retains its adhesive properties up to approximately 500° F.

Figure 4:
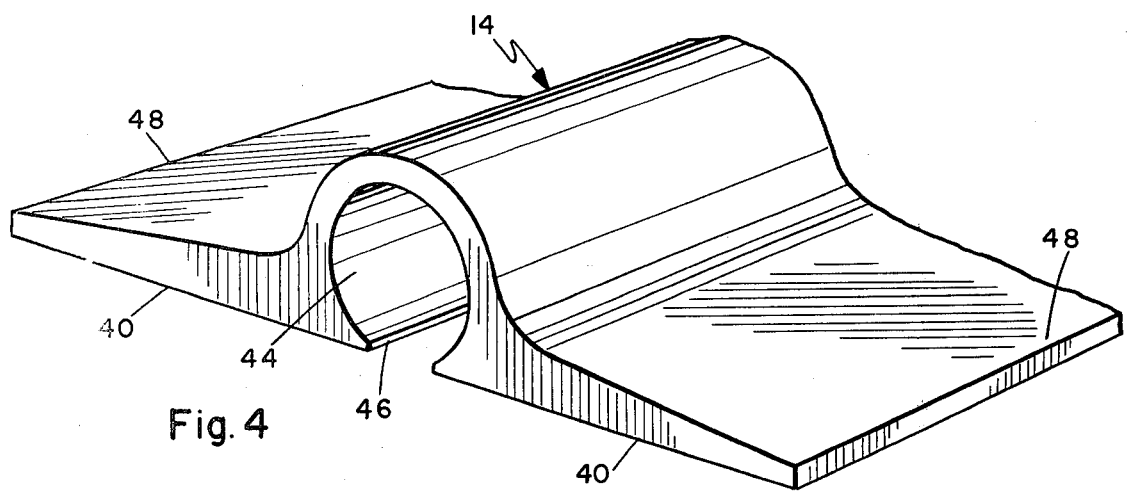
FIG. 4 is a perspective view of a portion of a thermal conductor.
Figure 5:
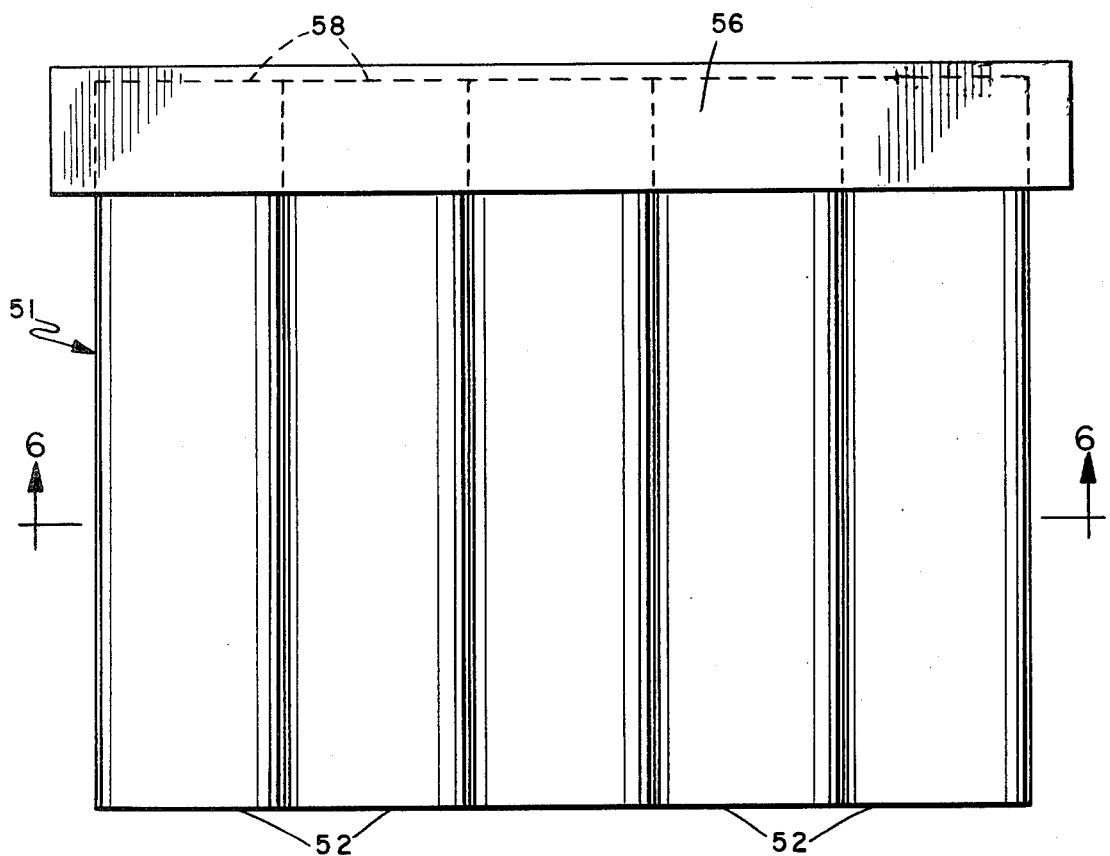
Figure 6:
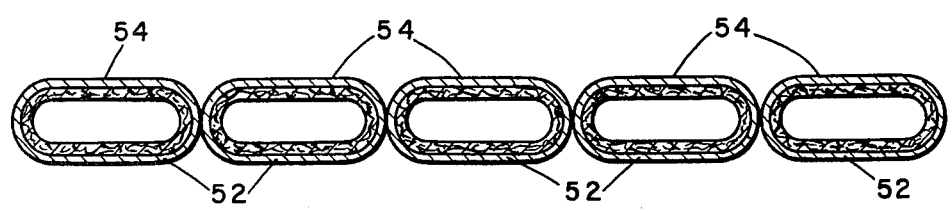

With reference to both FIGS. 3 and 4, the thermal conductors 14 each have broad flat surfaces 40 in contact with the flat surface 42 of the flat collector plate 10 on opposite sides of the heat pipe 12. The thermal conductor 14 contacts the heat pipe 12 for the full length of the heat pipe 12 and for all of the circumference of the heat pipe 12 except for a very small opening 46 between the adjacent ends of the flat surfaces 40 of the thermal conductor 14.

It is seen that the thickness of the thermal conductor 14 increases from the extreme ends 48 of its broad flat surfaces 40 toward its inner surface 44.

The thermal conductors 14 are aluminum alloy extrusions. The outside tubes 18 of the heat pipes 12 are copper tubing.

A thermal joint compound 50 is applied between the surface 44 of the thermal conductors 14 and the contacted surface 18a of the heat pipe 12, for filling voids between the thermal conductors 14 and the contacted surfaces 44, 18a. The thermal joint compound 50 is a silicon compound having a thermal conductivity in the range of about 5 to 20 BTU-IN/HR-FT$^2$-° F. A preferred thermal joint compound is Wakefield type 120 or its equivalent having a thermal conductivity of about 7.4. By way of contrast the thermal conductivity of air is 0.192. Therefore the thermal efficiency is appreciably increased by filling the air voids with the thermal compound 50. The air voids between the surfaces 40 of the thermal conductor 14 and the contacted surfaces 42 of the collector plate 10 are filled with the high temperature thermally conductive adhesive 38, thereby enhancing the thermal efficiency of heat conduction between these surfaces 40, 42.

The flat collector plate 10 is of uniform thickness. The heat pipes 12 are arrayed over a broad flat surface area of the collector plate 10. The distances between the thermal conductors 14 on the collector plate 10 is governed by the thickness of the plate 10. Lateral transfer of heat increases as the thickness of the plate 10 increases. Thus fewer thermal conductors 14 and heat pipes 12 are required when the plate 10 thickness is increased.

Having described my invention, I now claim:

1. An isothermal process solar collector panel, comprising
    a collector means for absorbing radiant heat; and
    a plurality of isothermal process heat pipes in an array over a surface of the collector means, wherein each heat pipe is closed at both ends and contains a thermodynamic working fluid for transferring heat energy from the collector means to a second fluid flowing through a manifold pipe for conducting said heat energy from the collector panel;

wherein the collector means has a broad uniformly flat surface area over which the heat pipes are arrayed; and further comprising a plurality of thermal conductors for conducting heat energy from the collector means to the heat pipes, wherein each of the thermal conductors has broad flat surfaces in contact with the flat surface of the flat collector means on opposite sides of the heat pipe, and an inner surface in mating contact with most of the heat pipe; with the thickness of the thermal conductor increasing from the extreme ends of its broad surfaces toward its inner surface.

2. An isothermal process solar collector panel according to claim 1, further comprising a manifold pipe coupled to the heat pipes for conducting said second fluid from the collector panel;

wherein one end of each heat pipe is coupled to the collector means and has an evaporator section wherein heat energy is transferred from the collector means to said thermodynamic working fluid, and the other end of each heat pipe is positioned within the manifold pipe and has a condenser section wherein heat energy is transferred from said thermodynamic working fluid to said second fluid flowing through the manifold pipe.

3. An isothermal process solar collector panel according to claim 1, further comprising a thermal joint compound between the thermal conductors and the contacted surfaces of the heat pipes for filling voids between the thermal conductors and said contacted surfaces.

4. An isothermal process solar collector panel according to claim 1 further comprising a high temperature thermally conductive adhesive between the thermal conductors and the contacted surfaces of the collector means for filling voids between the thermal conductors and said contacted surfaces, and for adhering the thermal conductors to said contacted surfaces.

5. An isothermal process solar collector panel according to claim 1, wherein the thermal conductors are extrusions.

6. An isothermal process solar collector panel according to claim 5, further comprising a thermal joint compound between the thermal conductors and the contacted surfaces of the heat pipes for filling voids between the thermal conductors and said contacted surfaces.

7. An isothermal process solar collector panel according to claim 5, further comprising a high temperature thermally conductive adhesive between the thermal conductors and the contacted surfaces of the collector means for filling voids between the thermal conductors and said contacted surfaces, and for adhering the thermal conductors to said contacted surfaces.

8. An isothermal process solar collector panel according to claim 5, wherein the extrusions comprise an aluminum alloy.

9. An isothermal process solar collector panel according to claim 1, wherein the collector means is a plate of uniform thickness.

* * * * *